March 17, 1942.  E. V. FRANCIS  2,276,382
FEEDING APPARATUS
Filed March 10, 1938  2 Sheets-Sheet 2
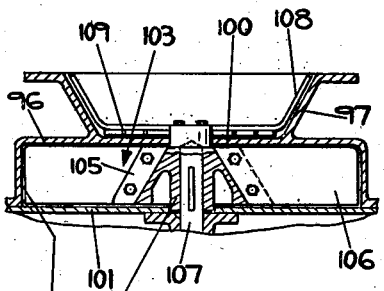
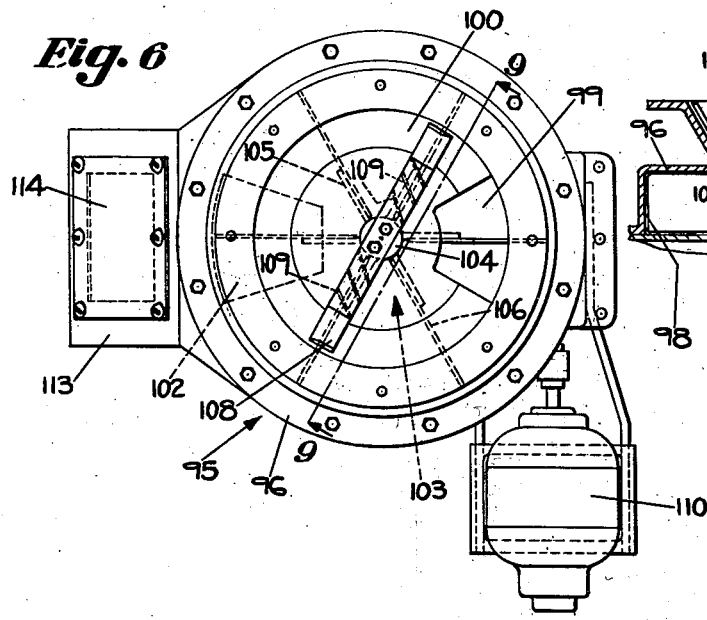
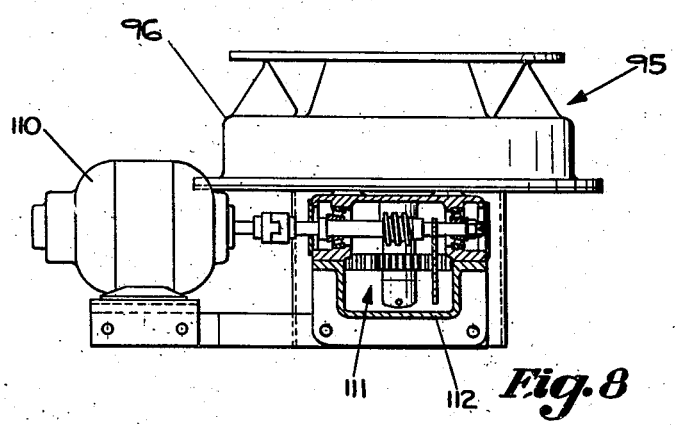
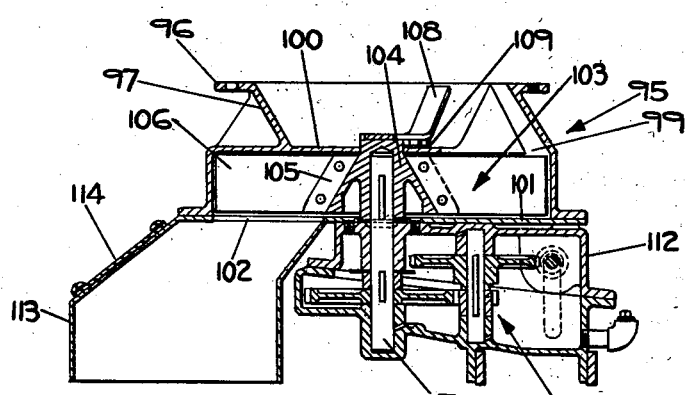
INVENTOR:
EARLE V. FRANCIS,
BY
Chas. M. Nissen,
ATTY.

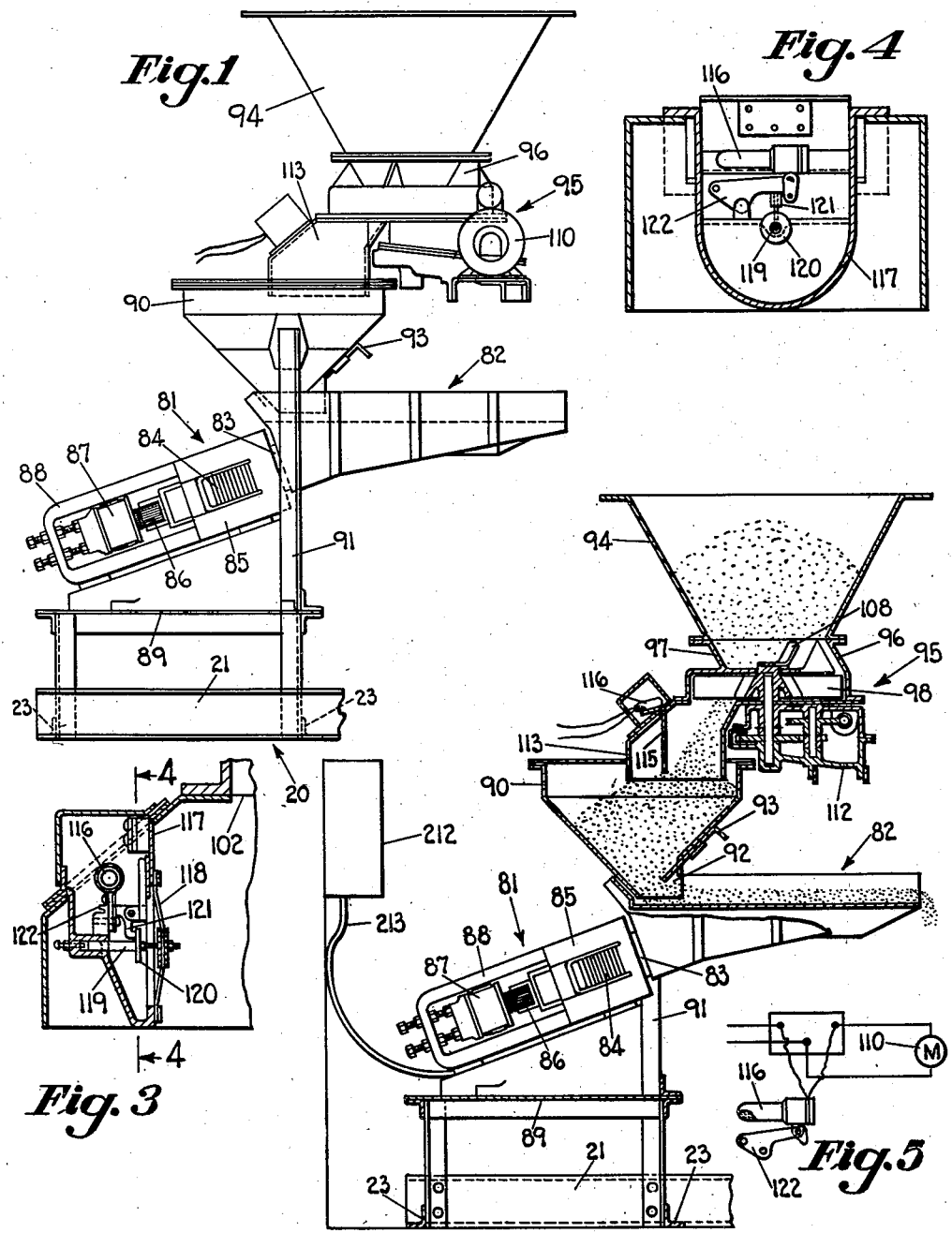

Patented Mar. 17, 1942

2,276,382

UNITED STATES PATENT OFFICE 2,276,382

FEEDING APPARATUS

Earle V. Francis, Columbus, Ohio, assignor to The Traylor Vibrator Company, a corporation of Colorado Application March 10, 1938, Serial No. 195,092

3 Claims. (Cl. 221—118)

This invention relates to apparatus for feeding granular material at a regulated rate, and one of the objects of the invention is the provision of improved and efficient apparatus and controlling means therefor, to effect the feeding of various kinds of granular material continuously at such weight rate as may be predetermined.

A further object of the invention is to provide improved and efficient mechanism for transferring from storage to conveyor apparatus pulverulent material at a reduced head to prevent undue flow of such material during the operation of the conveyor apparatus.

Another object of the invention is the provision of means for delivering pulverulent material by segregation and in batches from storage to a feeder at a reduced head to prevent undue flow when it reaches the feeder.

A further object of the invention is the provision of mechanism for delivering granular material to a feeder at a substantially constant head either continuously or intermittently as controlled by the amount of material resting on the feeder.

Another object of the invention is the provision of improved delivery mechanism to a vibratory electric feeder having a feeder-pan, adapted to maintain constant the amount of material resting on the feeder-pan.

Other objects of the invention will appear hereinafter, the novel features and combinations being set forth in the appended claims.

In the accompanying drawings,

Fig. 1 is a side elevational view of the apparatus comprising my invention;

Fig. 2 is a sectional elevational view of the apparatus of Fig. 1 of the drawings, except that the vibratory motor structure of the feeder is not shown in section;

Fig. 3 is a sectional elevational view of a modified form of control switch for the delivery mechanism;

Fig. 4 is a sectional view taken on the line 4—4 of Fig. 3 looking in the direction of the arrows;

Fig. 5 is a wiring diagram for the motor of the delivery mechanism;

Fig. 6 is a plan view of the delivery mechanism with the storage hopper removed;

Fig. 7 is a sectional elevational view of the delivery mechanism;

Fig. 8 is a side elevational view of the delivery mechanism with the reduction gearing thereof shown in section;

Fig. 9 is a sectional elevational view through the upper portion of the delivery mechanism taken on the line 9—9 of Fig. 8.

It has been found that when certain granular materials were attempted to be fed, such as pulverized limestone and lime, Carlton's earth and activated carbon, or any similar pulverulent material under 200 mesh, said material would tend to flow much after the fashion of a liquid, as a consequence of which even an electro-magnetic vibratory feeder, which is generally susceptible to very accurate control, cannot maintain the material under the desired control at all times.

The apparatus comprising my invention provides for a substantially constant head of material on the vibratory feeder or, in other words, provides for a substantially constant amount of material in the hopper of the vibratory feeder which insures a uniform pressure or head upon the material in the bottom of the feeder hopper regardless of the amount of material in the primary or storage hopper, thus insuring against any free or uncontrolled flow thereof and thereby insuring accurate control of the material by the feeder.

Referring particularly to Figs. 1 and 2 of the drawings, I provide an electro-magnetic vibratory feeder 81 which may follow substantially the structure of the vibratory feeder disclosed in the application of James A. Flint, Serial No. 73,318 filed April 8, 1936, now Patent No. 2,251,856, dated Aug. 5, 1941, except for the fact that said feeder will not have any grizzly or grid as disclosed in said patent, or it may follow the structure disclosed in the patent to James A. Flint, No. 2,094,787 dated October 5, 1937.

Briefly described, said electro-magnetic feeder 81 comprises a trough shaped deck 82. The deck 82 is rigidly attached to and supported by an armature shaft 83 which is rigidly attached to the centers of a plurality of transversely extending spring bars 84, the ends of which are rigidly clamped in a casting 85 forming the main frame of the feeder 81. The spring bars 84 lie in a plane which forms an acute angle with the plane of the deck 82 so that when the armature shaft 83 and the deck 82 are vibrated a conveying action toward the right as viewed in Fig. 2, will be imparted to any material carried by said deck 82 due to the composite action of the vertical and horizontal components of movement thereof.

Adjacent its rear end the armature shaft 83 carries an armature 86 preferably built up of laminated steel which is acted upon by a field structure 87 including a laminated iron core, which field structure is excited from alternating or "mixed" current to cause vibration of the armature 86. It may be further stated that the field structure 87 is adjustably mounted in a pair of yokes 88 which are rigidly attached to the main frame casting 85. The entire feeder 81 is supported upon a stand 89 attached to a frame 20 formed by a pair of longitudinally extending channel members 21, 21 to which are rigidly attached a plurality of transversely extending angle members 23.

The electro-magnetic feeder 81 has the very important characteristics of uniformly distributing over substantially the entire bottom of the deck 82 any granular material received by said deck 82. The rate of feed of this type of feeder may be adjusted between extreme wide limits in relatively small increments so that the material is discharged in a very uniform manner.

As was above set forth, there are a number of granular materials, particularly powdered or fine mesh or pulverulent granular materials, which tend to flow like liquid, and it has been found that if a large storage hopper is provided which feeds directly into the deck or pan 82 of the vibratory feeder 81, it is impossible to control satisfactorily the rate of flow of these materials because when the storage hopper or bin is full of material there is a very large head, or high pressure per square inch, on the material which causes it to flow like a liquid even though the feeder 81 is completely shut off. I therefore provide means which is particularly useful with material of this type but which may be omitted where large grained material or material which does not tend to flow, is employed.

To provide a substantially constant head of material on the deck 82 or, in other words, to segregate the material in the storage hopper from the material which is in direct communication with the deck 82 and to feed from the former to the latter in batches to maintain substantially constant the head or amount of material supported directly from the deck 82 which is below a value at which said material will flow freely, I provide a feeder accumulator in the form of a hopper 90 of relatively low capacity and relatively low height which is supported from the main frame 20 by upstanding angle members 91. The hopper 90 has a bottom opening 92 which opens directly into the trough of the deck 82 and which opening 92 is controlled by an adjustable gate 93. The sidewalls adjacent the bottom of the hopper 90 project into the trough-like deck 82 so that the material in the hopper 90, in effect, rests directly upon the bottom of the deck 82 and due to this overlapping relation there is no spillage of material from the hopper 90 or deck 82.

Positioned above the feeder hopper 90 is a storage hopper 94 which is preferably rigidly bolted or otherwise attached to the bottom of a large storage bin or compartment in which the material to be fed by the constant capacity feeder of my invention is stored.

Interposed between the storage hopper 94 and the feeder hopper 90 is a delivery mechanism 95 which is so constructed as to maintain the segregation of material within the storage hopper 94 and the material within the feeder hopper 90 so that regardless of the amount of material in the feeder hopper 90 or the bin to which it is connected, the pressure exerted by the material in the feeder hopper 90 and any material in direct contact therewith will be definitely limited and will be maintained substantially constant to the end that the feed rate of the feeder 81 will be substantially the same whenever the amplitude of vibration thereof is constant.

The structure of the delivery mechanism 95 is best seen by reference to Figs. 2 and 6 to 9, inclusive, of the drawings, to which attention is now directed. Said delivery mechanism 95 is formed by a casting 96, the top portion of which forms a hopper-like continuation 97 of the storage hopper 94 to which the casting 96 is bolted and by which the delivery mechanism 95 is supported. The bottom portion of the casting 96 forms a material transfer chamber 98, communication to which is provided from the hopper-like continuation 97 by way of a restricted opening 99 (Fig. 6) in the integral web 100 of said casting 96 which forms the bottom of the hopper-like continuation 97 and the top of the material transfer chamber 98. The bottom of the material transfer chamber 98 is formed by a removable disc 101 provided with a restricted opening 102 which is diametrically opposed to the opening 99, as shown in Figs. 6 and 7.

Within the material transfer chamber 98 is a segregator or combined separator and feeder 103 which is adapted to transfer material from the hopper 94 to the hopper 90 when rotated, but to prevent a direct flow of material from said hopper 94. Said segregator 103 is formed by a hub 104 having integral radial wings 105 (there being six in the segregator illustrated) to which are removably attached a plurality of radial blades 106. It will be noted by reference to Fig. 6 of the drawings that the openings 99 and 102 are of such angular relation and radial extension that it is impossible for material to flow from one to the other without being intercepted by one of the blades 106. As a consequence, it is impossible for material to flow directly from the hopper 94 and out through the opening 102 unless the segregator 103 is caused to rotate.

The segregator 103 is mounted upon an upstanding drive shaft 107 which carries at its top, scraper means 108 adapted to cut or scrape material from the interior walls of the member 97 which carries on its bottom a plurality of angularly disposed blades 109 adapted to force material which may accumulate on the web 100, axially outwardly until it falls through the opening 99.

The drive shaft 107 is driven from an electric motor 110 through reduction gearing mechanism 111 (Figs. 7, 8) contained within a housing 112 all of which is supported by the casting 96. It will thus be evident that whenever the motor 110 is operated the material will be positively transferred from the opening 99 to the opening 102, and unless the segregator 103 is thus rotated material cannot flow from said opening 99 to said opening 102. It will thus be seen that the segregator 103 acts not only as a feeder but also as a multiple radial gate valve between the hopper 94 and the discharge opening 102.

Positioned directly below the opening 102 and forming a tight connection with the disc 101 is a chute 113 the bottom of which extends below the top of the hopper 90, as clearly illustrated in Fig. 2 of the drawings.

Associated with the chute 113 is a removable plate 114 which, in the preferred form of my invention, is removed so that there may be inserted into the chute 113 an electric switch operating mechanism comprising a pivoted plate 115 (see Fig. 2) which carries a tube type mercury switch 116 for opening and closing the circuit of the motor 110, as diametrically illustrated in Fig. 5 of the drawings.

The operation of the delivery mechanism may be briefly described as follows: Since the chute 113 extends into the hopper 90, both said hopper 90 and said chute 113 may be substantially completely filled with material without said material running over from said hopper 90. Whenever the chute 113 is not filled with material the pivoted plate 115 will be in its upright position, as illustrated in Fig. 2, and the switch 116 will be closed to cause operation of the delivery mechanism 95 to deliver material from the hopper 94 to the hopper 90. As material tends to build up in the chute 113 the pivoted plate 115 is swung about its pivot to open the contacts of switch 116 to shut off the motor 110. As a consequence, the hopper 90 will be maintained substantially full of material at all times and when it is full the delivery mechanism 95 will be shut down.

The control mechanism for the motor 110 may be omitted if desired and the motor 110 run continuously, but the inclusion of such control mechanism is preferred for the sake of economy in the consumption of electric current. For example, if the motor 110 runs continuously, it will deliver material from the hopper 94 to the hopper 90 until said hopper 90 and the chute 113 are completely filled with material. When this condition is realized, the material received between the blades 106 of the segregator 103 will not fall through the opening 102 but will continue to rotate with said blades 106. As a consequence, the segregator 103 will simply be full of material which will continue to rotate with said blades 106. However, since this rotation does no useful work I prefer to control the motor 110 in response to the condition of the material in the hopper 90, as above described. It is to be noted, however, that under either condition of operation the material in the hopper 94 is segregated from the material in the hopper 90 and the head on the deck 82 is maintained substantially constant.

In Figs. 3 and 4 of the drawings, I have illustrated a modified form of control for the mercury switch 116, which may be substituted for that illustrated in Fig. 2 of the drawings. This modified control comprises a frame 117 adapted to replace the cover plate 114 and to extend into the chute 113. Said frame 117 is in the form of an enclosing housing provided with a circular opening closed by a flexible diaphragm 118. To the center of the diaphragm 118 is attached an operating slide rod 119 carrying a disc 120 which bears against a pivoted bell crank lever 121 which is adapted to operate a pivoted lever 122 upon which is supported the mercury switch 116. It will be evident, when this form of operating mechanism is employed, that as the material builds up and fills the chute 113, the diaphragm 118 will yield and move the operating slide rod 119 to the left, as viewed in Fig. 3, thereby to rock the switch 116 through the levers 121 and 122. The weight of the lever 122 and the switch 116 are sufficient to return the diaphragm to the position illustrated in Fig. 3 in the absence of material filling the chute 113.

In the operation of the apparatus comprising my invention, granular material, which is intended to embrace substantially any material other than a fluid, to be fed at a controlled rate will be stored in a large hopper or storage bin with the bottom of which is associated the hopper 94. This granular material is fed from the hopper 94 by the delivery mechanism 95 into the material accumulator or feeder hopper 90 at such a rate as to maintain the material in said feeder hopper 90 substantially constant, or, in other words, to maintain said hopper 90 substantially full of material at all times thereby providing a substantially constant head of granular material on the deck 82 of the electro-magnetic vibratory feeder 81.

It may be stated that, if desired, the hopper 90 may be eliminated entirely and the chute 113 extended downwardly below the top of the deck 82 and provided with a gate 93 or not, as desired.

It may also be pointed out that the control mechanisms for the motor 110 of the delivery mechanism 95, as illustrated in Fig. 2, or as illustrated in Figs. 3 and 4, are preferably employed to prevent operation of said delivery mechanism when the hopper 90 is full of material but said control may be omitted if desired, as above set forth.

It is, of course, evident that this delivery mechanism is effective to isolate the granular material in the hopper 94 and the granular material in the chute 113 and hopper 90 to maintain the aforesaid constant head on the deck 82. This provides for a very accurate control of the rate of feed of the material on the deck 82 as determined substantially entirely by the amplitude of vibration of said electro-magnetic feeder 81.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Conveyor apparatus for free flowing pulverulent material comprising the combination with an electro-magnetic vibratory feeder, of a feed hopper therefor, a storage hopper, motor driven means for segregating and feeding batches of such material from said storage hopper to said feed hopper, and means responsive to the amount of such material in said feed hopper for controlling said motor driven means to maintain the head of material in said feed hopper below the value at which it flows freely.

2. Conveyor apparatus for granular material which tends to flow freely under a predetermined head, comprising the combination with a vibratory electro-magnetic feeder, of a storage hopper, and mechanism for delivering material to said feeder from said hopper while maintaining a substantially constant head on said feeder below said predetermined head, comprising a casing forming a circumferential chamber, a restricted inlet between said storage hopper and chamber, a pocket forming rotor cooperating with said casing to provide separate pockets to receive material from said storage hopper and segregate it from the material in said storage hopper, a discharge opening from said chamber, and an accumulator fed from said discharge opening and leading to said feeder and adapted to maintain said segregated material on said feeder.

3. In feeding apparatus, the combination with a storage hopper for granular material which tends to run freely under a predetermined head, of an electro-magnetic vibratory feeder, a feeder hopper, and mechanism constructed and arranged to maintain a substantially constant amount of material in said feeder hopper which is separated from the material in said storage hopper at all times and which provides a head on said feeder below that at which said material flows freely, comprising means for segregating and removing material from said storage hopper and delivering it to said feeder hopper.

EARLE V. FRANCIS.